US007453520B2

(12) United States Patent
Kim (10) Patent No.: US 7,453,520 B2
(45) Date of Patent: Nov. 18, 2008

(54) METHOD AND APPARATUS FOR PROCESSING A PLURALITY OF INPUT VIDEO SIGNALS IN DISPLAY DEVICE

(75) Inventor: Jung-dae Kim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 548 days.

(21) Appl. No.: 10/837,667

(22) Filed: May 4, 2004

(65) Prior Publication Data
US 2004/0263694 A1   Dec. 30, 2004

(30) Foreign Application Priority Data
Jun. 24, 2003 (KR) .................... 10-2003-0041057

(51) Int. Cl.
*H04N 5/44* (2006.01)
(52) U.S. Cl. .................. 348/553; 348/558; 348/563; 348/569
(58) Field of Classification Search ......... 348/553–555, 348/558, 564–565, 569, 705–706; 725/38–41, 725/131, 133, 151, 153; *H04N 5/44*
See application file for complete search history.

(56) References Cited

U.S. PATENT DOCUMENTS

| 5,528,304 | A | * | 6/1996 | Cherrick et al. ............... 725/41 |
| 6,064,449 | A | * | 5/2000 | White et al. .................. 348/732 |
| 6,141,003 | A | * | 10/2000 | Chor et al. .................. 715/719 |
| 6,141,058 | A | * | 10/2000 | Lagoni et al. ............... 348/563 |
| 6,459,906 | B1 | | 10/2002 | Yang |
| 6,587,154 | B1 | * | 7/2003 | Anderson et al. ........... 348/553 |
| 6,667,693 | B1 | * | 12/2003 | Kim et al. ................. 340/815.4 |
| 6,753,928 | B1 | * | 6/2004 | Gospel et al. ............... 348/569 |

FOREIGN PATENT DOCUMENTS

JP            11-261918          9/1999

OTHER PUBLICATIONS

Korean Office Action (2 pages) dated Feb. 25, 2005 of Korean Application No. 10-2003-0041057 related to the present U.S. patent application, including English translation thereof (2 pages).

* cited by examiner

*Primary Examiner*—Trang U Tran
(74) *Attorney, Agent, or Firm*—Staas & Halsey LLP (57) ABSTRACT

An apparatus and method of processing a plurality of video input signals in a display device by sensing a new video signal, aside from a presently displayed video signal, input through a video interface, and automatically displaying a menu of display options for the newly input video signal to convert input/output paths of video signals from the presently displayed video signal to the newly input video signal. Input of a new video signal, aside from a presently displayed video signal, is periodically checked, and if the new video signal is input, a new video signal input message and a predetermined menu for selecting whether to display the new video signal are automatically displayed. According to an input menu selection signal, the new video signal is displayed or the displaying of the presently displayed video signal is continued.

23 Claims, 6 Drawing Sheets

METHOD AND APPARATUS FOR PROCESSING A PLURALITY OF INPUT VIDEO SIGNALS IN DISPLAY DEVICE

CROSS-REFERENCE TO RELATED APPLICATIONS

This application claims the priority benefit of Korean Patent Application No. 2003-41057, filed on Jun. 24, 2003, in the Korean Intellectual Property Office, the disclosure of which is hereby incorporated by reference in its entirety.

BACKGROUND OF THE INVENTION

1. Field of the Invention

The present invention relates to a display device and method, and more particularly, to an apparatus and method processing a plurality of video input signals in a display device, which sense a new video signal input through a video interface aside from a presently displayed video signal and automatically converts input/output paths of the new video signal.

2. Description of the Related Art

At present, most display devices include a video interface having various input terminals connecting various video signal inputs. When a user desires to watch a video signal input through another input terminal of the video interface other than a presently input video signal input through a presently used input terminal of the video interface, the user must connect to the other input terminal of the video interface and manually request/call/display an on screen display (OSD) menu using, for example, a keyboard or remote control of the display device, and then manipulate the OSD menu to convert input/output video signal paths for the newly input video signal.

U.S. Pat. No. 6,459,906 discloses such a display device. However, the user has to repeat these manual operations whenever the user switches video interfaces, thereby being bothersome and complicated. In particular, such a problem becomes serious in a case where small-size mobile display devices are concerned.

SUMMARY OF THE INVENTION

The present invention provides an apparatus and method processing a plurality of video input signals in a display device, which senses a new video signal input through a video interface other than a presently displayed video signal, inform a user of the input of the new video signal via an on screen display (OSD), and automatically convert input/output paths of the new video signal based on the user's selection.

Additional aspects and/or advantages of the invention will be set forth in part in the description which follows and, in part, will be obvious from the description, or may be learned by practice of the invention.

According to one aspect of the present invention, there is provided an apparatus for processing a plurality of video input signals in a display device. The apparatus comprises a video interface, a first signal processor, and a second signal processor. The video interface receives various video signals input from outside the display device (i.e., the video interface receives externally input video signals). The first signal processor selects a video signal from a plurality of video signals output from the video interface, decodes the selected video signal, and outputs the decoded video signal. The second signal processor, if a second video signal input from the video interface is sensed when a first video signal output from the video interface is displayed, or the second video signal input through the video interface is sensed when the first video signal output from the first signal processor is displayed, displays a predetermined menu for selecting whether to display the second video signal and performs signal processing for displaying the first video signal and/or the second video signal according to the selected menu.

According to anther aspect of the present invention, there is provided a method of processing a plurality of video signals in a display device. The method comprises periodically checking if a new video signal, aside from a presently displayed video signal, is input, if the new video signal is input, displaying a new video signal input message and a predetermined menu for selecting whether to display the new video signal, and according to the menu selection signal, displaying the new video signal or continuing to display the presently displayed video signal.

BRIEF DESCRIPTION OF THE DRAWINGS

The above and/or other aspects and advantages of the present invention will become more apparent by describing in detail an exemplary embodiment thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
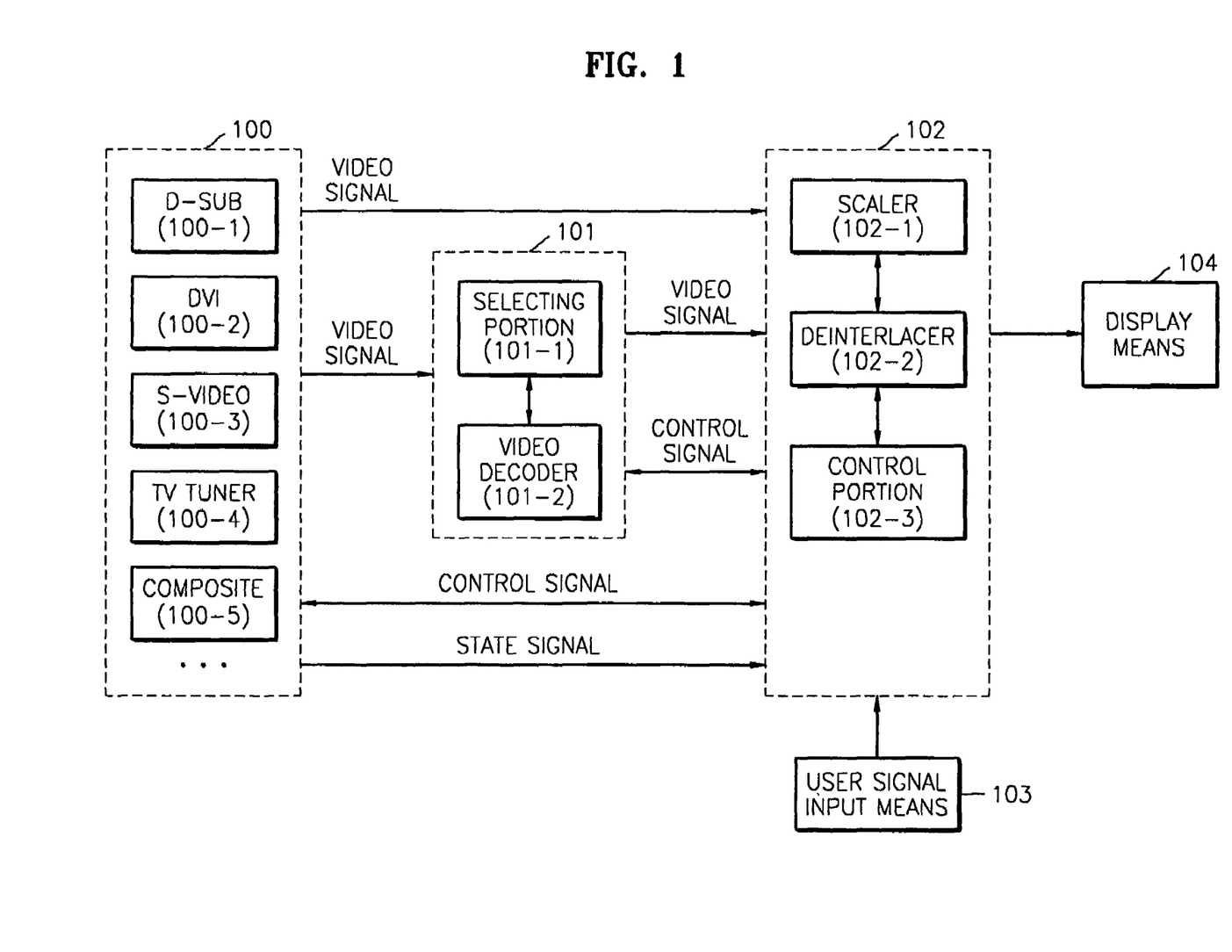
FIG. 1 is a functional block diagram of an apparatus processing a plurality of video input signals in a display device, according to an embodiment of the present invention.

FIG. 1 is a functional block diagram of an apparatus processing a plurality of input video signals in a computing device, such as a computer, a display device, or etc., according to an embodiment of the present invention. The apparatus of the present invention may be achieved by providing a video interface 100, a first signal processor 101, a second signal processor 102, a user signal input unit 103, and a display unit 104. According to an aspect of the invention, the display unit 104 is a unit that displays input video signals on a screen, such as a television or a computer display monitor. In the present invention, the video interface 100 includes external input terminals, such as a D-SUB terminal 100-1, a digital video interactive (DVI) terminal 100-2, a separate (S)-VIDEO terminal 100-3, a TV tuner terminal 100-4, and a COMPOSITE terminal 100-5. In the present invention, the first signal processor 101 includes a selecting portion 101-1 and a video decoder 101-2. In the present invention, the second signal processor 102 includes a scaler 102-1, a deinterlacer 102-2, and a control portion 102-3.

Figure 2A:
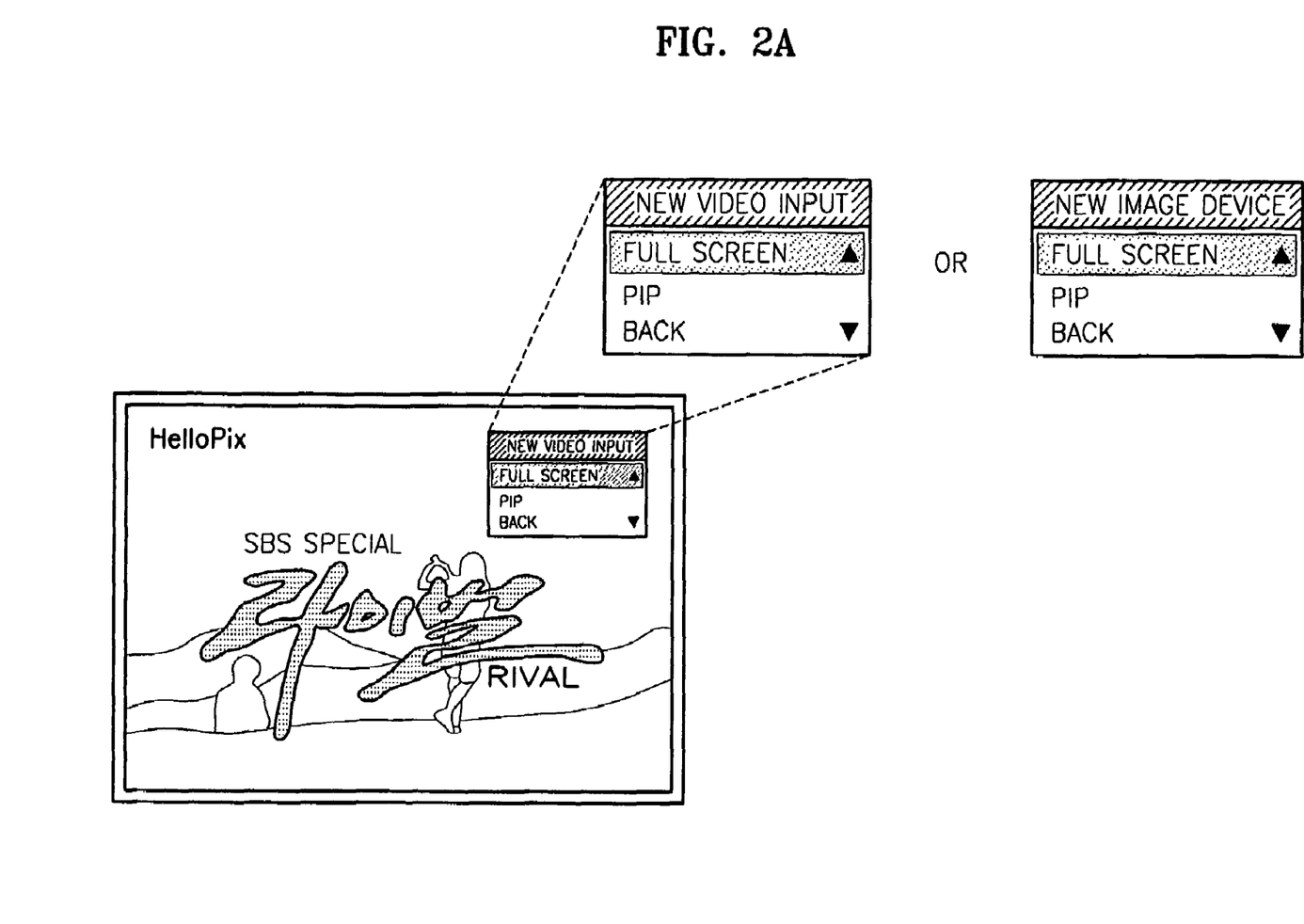
FIGS. 2A through 2D are example display screens of graphical user interfaces to process a plurality of input video signals in a display device, according to an embodiment of the present invention.
Figure 2B:
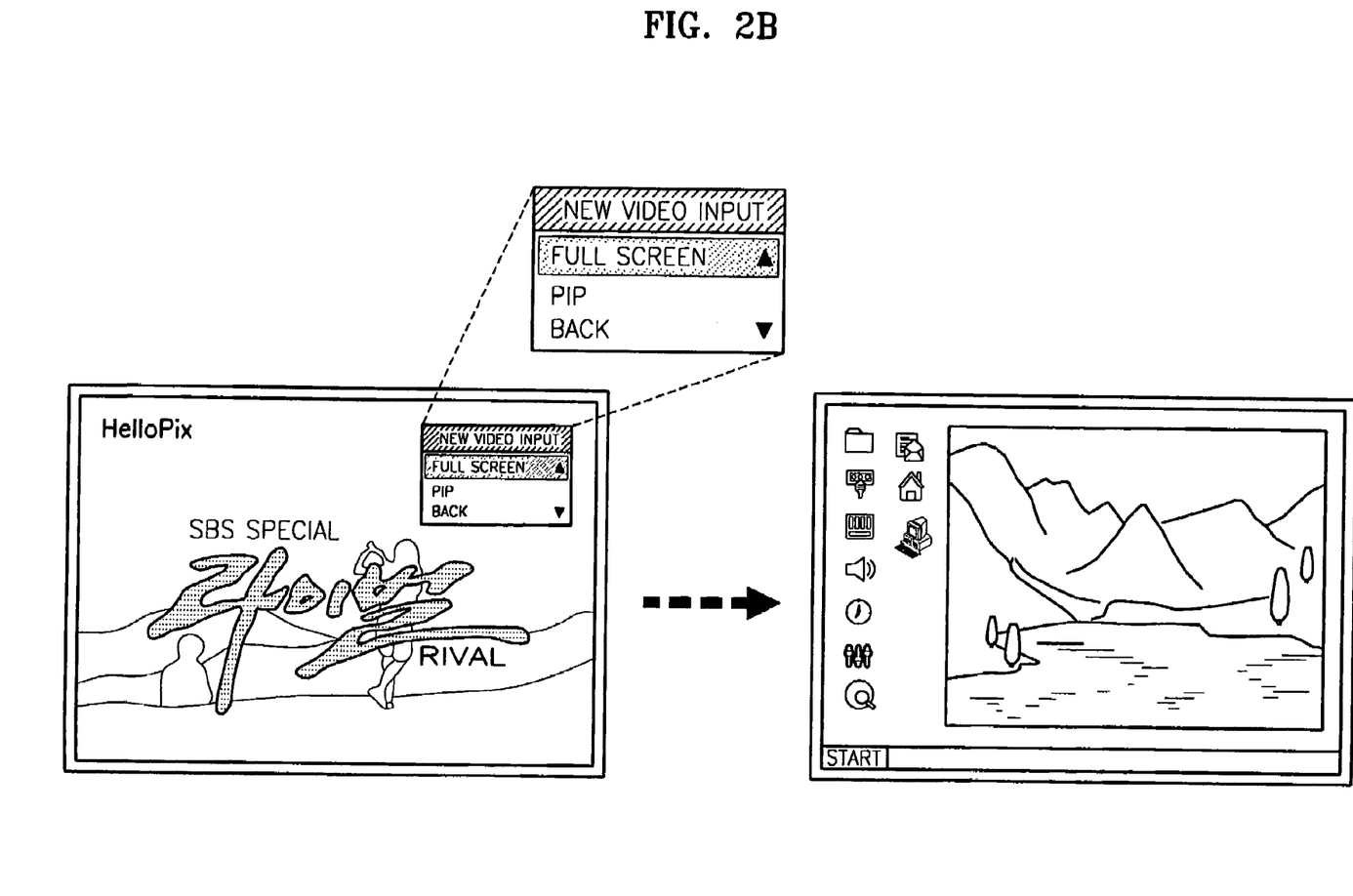
Figure 2C:
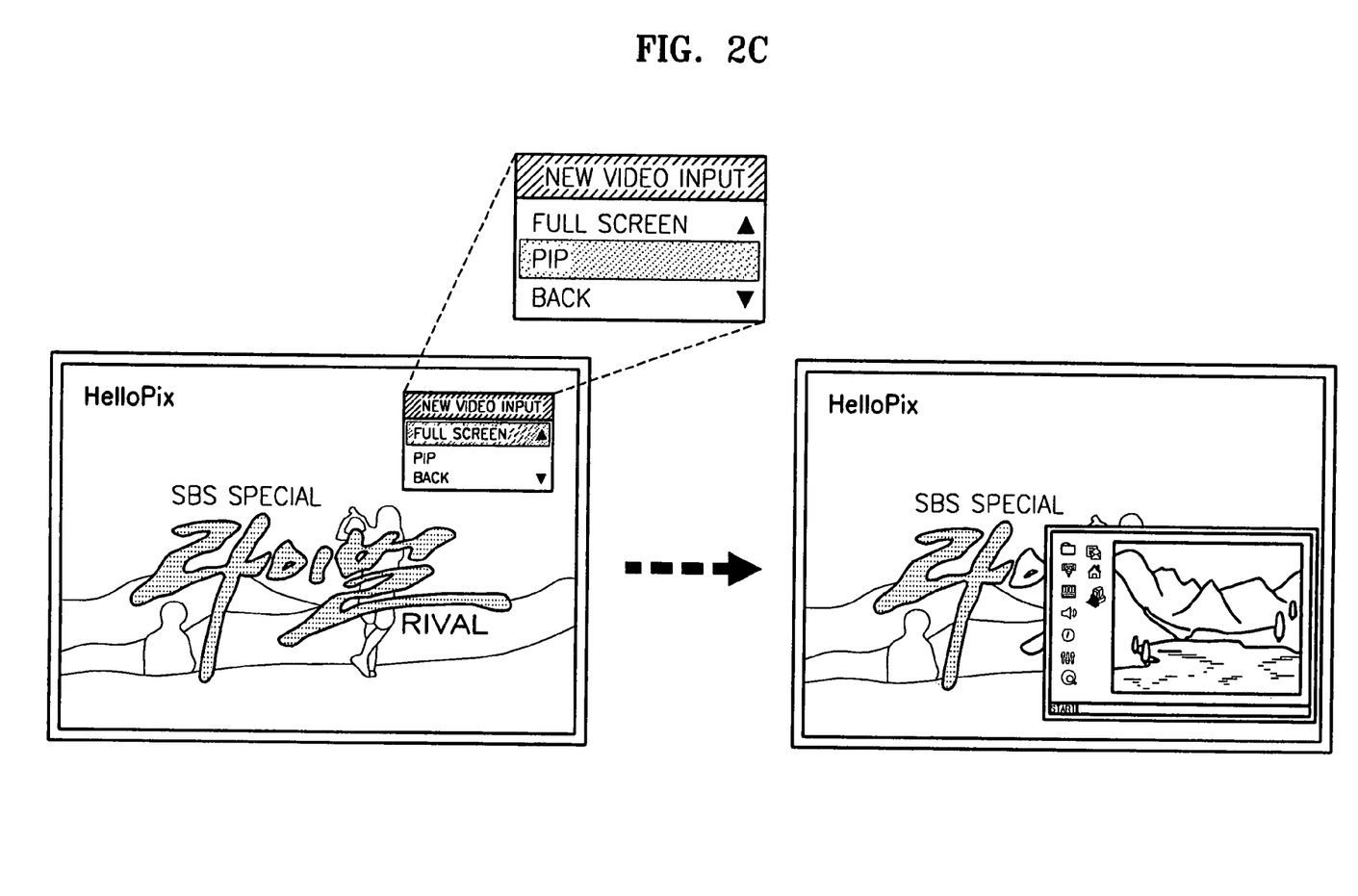
Figure 2D:
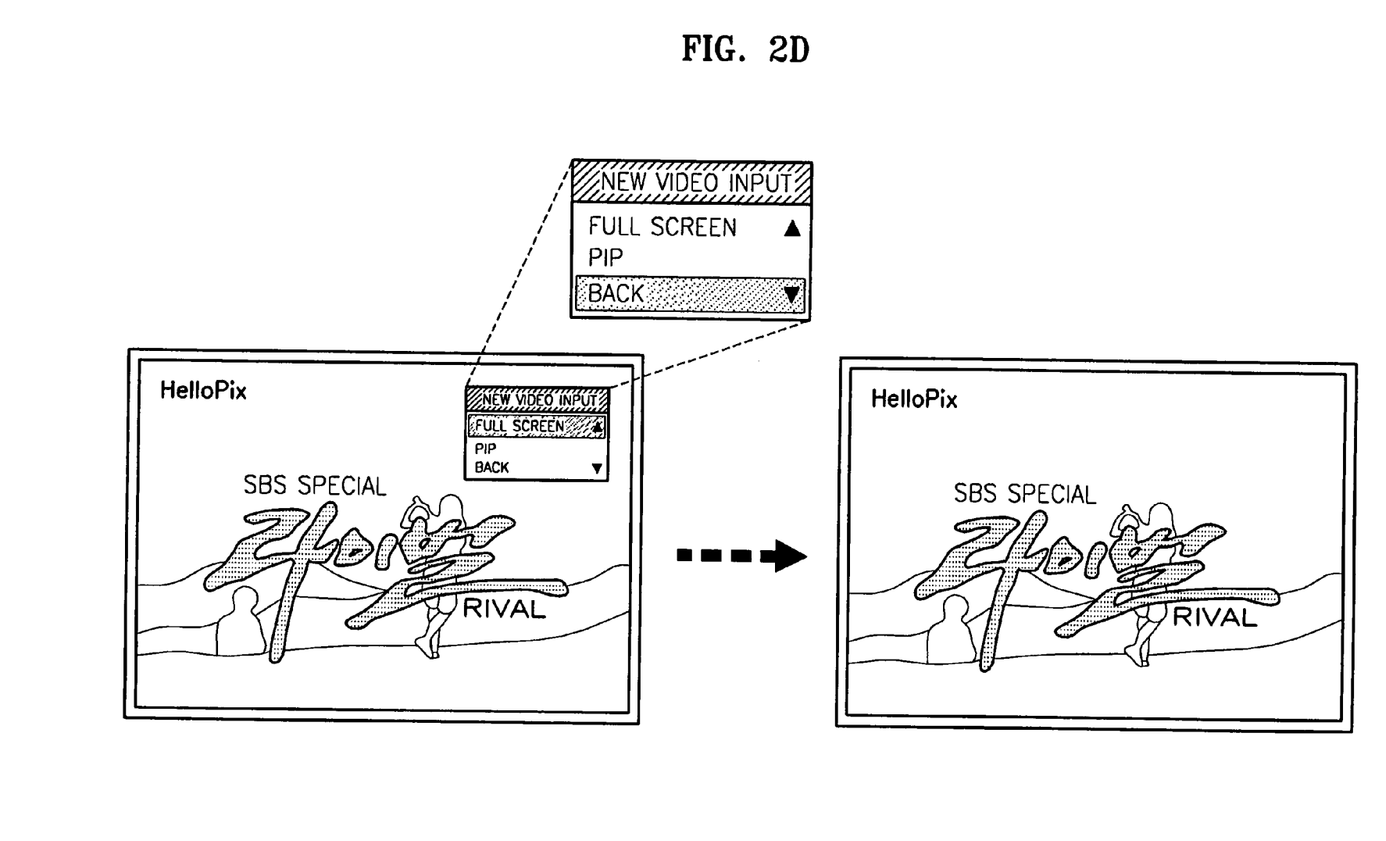

FIGS. 2A through 2D are example display screens of graphical user interfaces to process a plurality of input video signals in a display device, according to an embodiment of the present invention. FIG. 2A illustrates an on screen display (OSD) menu of display options displayed for a new input video signal along with a new video signal input message, when a new video signal is input through the video interface 100 while a presently input video signal is displayed. FIG. 2B illustrates a display screen where the presently displayed video signal is converted into the new video signal when a FULL SCREEN display option for the new input video signal is selected from the OSD menu. FIG. 2C illustrates a screen where the presently displayed video signal and the new video signal are simultaneously displayed when a picture in picture (PIP) display option for the new input video signal is selected from the OSD menu. FIG. 2D illustrates a screen where the presently displayed video signal is continuously displayed when a BACK (cancel or original screen) display option for the new input video signal is selected from the OSD menu.

Figure 3:
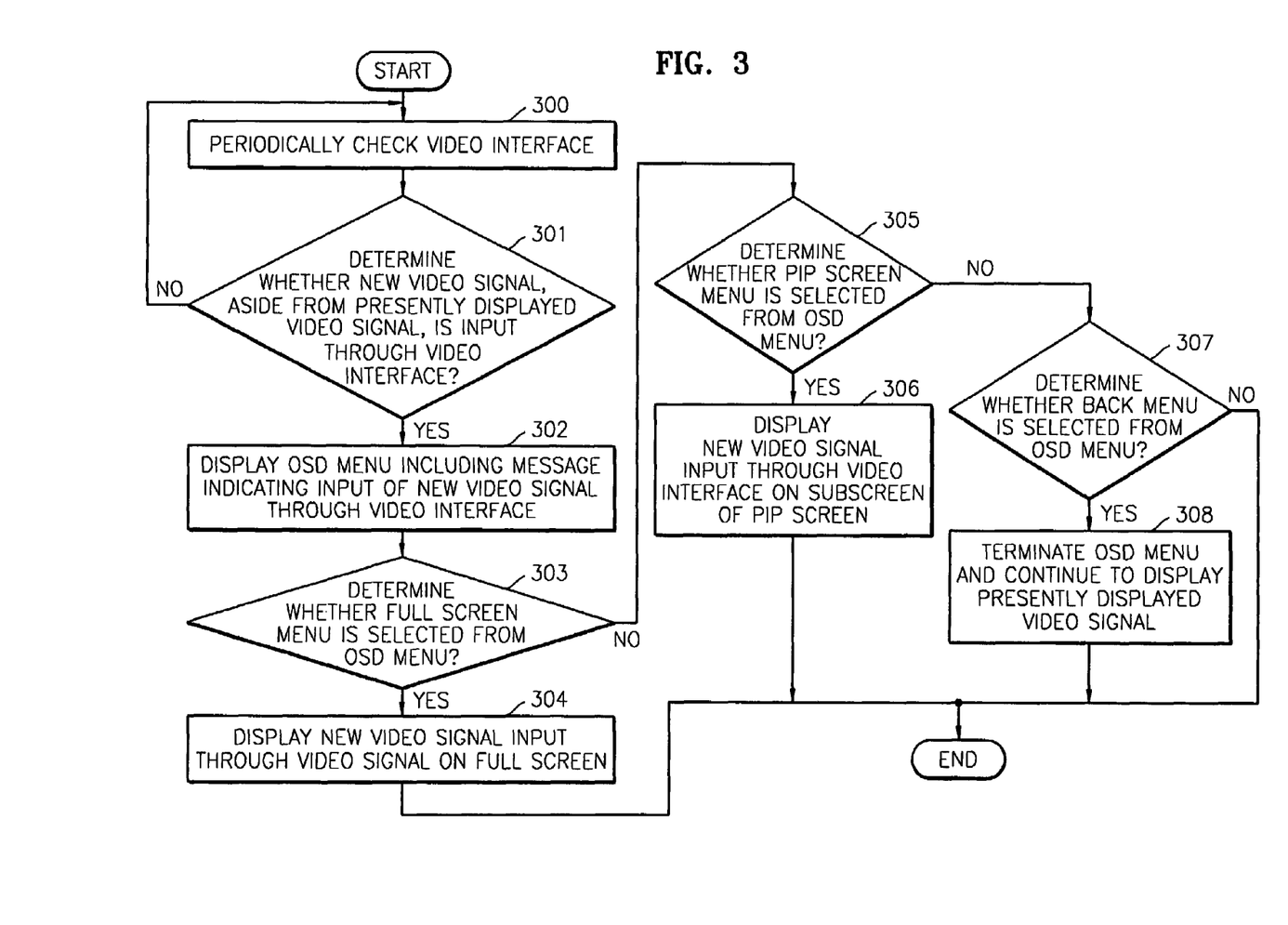
FIG. 3 is a flowchart of processing a plurality of input video signals in a display device, according to an embodiment of the present invention.

FIG. 3 is a flowchart of processing a plurality of input video signals in a display device, according to an embodiment of the present invention. The method comprises, at operation 300, periodically checking a video interface 100, at operation 301, determining whether a new video signal, aside from a presently displayed video signal, is input through the video interface 100, and, at operation 302, displaying an OSD menu of display options for the newly input video signal through the video interface 100 (i.e., a new video signal OSD menu is displayed), including displaying a message indicating the input of the new video signal through the video interface 100. For example, at operation 303, it is determined whether a FULL SCREEN display option for the newly input video signal is selected from the OSD menu, and, accordingly, at operation 304, the new video signal input through the video interface 100 is displayed on a full screen. At operation 305 it is determined whether a PIP screen display option for the newly input video signal is selected from the OSD menu, and, accordingly, at operation 306, the new video signal input through the video interface 100 is displayed on a sub screen of a PIP screen. At operation 307, it is determined whether a BACK display option for the newly input video signal is selected from the OSD menu, and, accordingly, at operation 308, the OSD menu is terminated to continue displaying the presently displayed video signal.

Hereinafter, the present invention will be described in more detail with reference to FIGS. 1 through 3. In a display device that includes the video interface 100 and is capable of displaying various kinds of video signals, when a user desires to display a new video signal other than a presently displayed video signal, the user does not have to use various keys to request/call/display an OSD menu to run through the OSD menu to convert video signal input/output paths for the newly input video signal. Instead, in the present invention, when the new video signal is input, the control portion 102-3 of the second signal processor 102 automatically senses the input of the new video signal, automatically display an OSD menu of display options for the newly input video signal, and automatically converts the input/output paths of the new video signal according a user input of one a plurality of selectable display options for the newly input video signal via the automatically displayed OSD menu. One of the new input video signal OSD display options is termination of the OSD menu and continuing displaying the presently displayed video signal. The present invention's automatic input video signal path conversion has a benefit of being similar to a benefit provided by an automatic program execution through a plug and play function when a personal computer (not shown) is connected to another device or a card corresponding to the device.

First, an apparatus processing a plurality of input video signals in a display device will be described with reference to FIGS. 1 and 2A-2D. The video interface 100 receives various kinds of video signals input from an external source. In the example described herein, the video interface 100 of the present invention receives video signals transmitted from three external devices (for example, a PC, a game console, or other video output, such as DVD player, and a TV). However, the number of external devices is not limited to three. For example, video interface 100 receives video signals transmitted from the PC (not shown) through the D-SUB terminal 100-1 and the DVI terminal 100-2. For example, the video interface 100 receives video signals transmitted from the game console (not shown) through the S-VIDEO terminal 100-3. Here, an S-VIDEO signal is formed by performing video transmission on two signals, i.e., a luminance signal Y and a chroma signal C, and the chroma signal C is formed by phase modulating two color difference signals of a composite signal. "S-VIDEO" is named in the sense that the luminance signal Y and the chroma signal C are separated from a composite signal. Use of S-VIDEO begins with the development of high-definition video devices, such as an S-VHS, which is advantageous in that a display quality superior to composite connection can be easily obtained. Also, for example, the video interface 100 receives video signals transmitted from the TV (not shown) through the TV tuner terminal 100-4 and the COMPOSITE terminal 100-5.

According to an aspect of the present invention, in response to a periodic request (i.e., a control signal) of the control portion 102-3 of the second signal processor 102, the video interface 100 outputs a state signal to the control portion 102-3. The state signal indicates which external device presently is inputting a video signal or which external device is inputting a new video signal. The state signal generation can be implemented according to any plug-and-play interface type specification, thereby providing plug-and-play video signal interface between a video signal device and a display unit. Among video signals input to the video interface 100, typically, video signals transmitted from the PC through the D-SUB terminal 100-1 and the DVI terminal 100-2 are directly output to the second signal processor 102 without being processed by the first signal processor 101. However, among the video signals input to the video interface 100, typically, video signals transmitted from a game console through the S-VIDEO terminal 100-3, from the TV through the TV tuner terminal 100-4, and from the COMPOSITE terminal 100-5 are output to the first signal processor 101.

The first signal processor 101 selects a video signal from the plurality of video signals output from the video interface 100 and outputs the selected video signal to the second signal processor 102 or decodes the selected video signal and outputs the decoded video signal to the second signal processor 102. As an example, the first signal processor 101 includes the selecting portion 101-1 and the video decoder 101-2. Typically, the selecting portion 101-1 selects a video signal from the video signals output from the S-VIDEO terminal 100-3, the TV tuner terminal 100-4, and the COMPOSITE terminal 100-5 of the video interface 100, and outputs the selected video signal to the video decoder 101-2 or the second signal processor 102. Furthermore, the control portion 102-3 of the second signal processor 102 outputs a selection control signal to the selecting portion 101-1 of the first signal processor 101 to select or deselect (as the case may be) one of the video signals output from the video interface 100 to the first signal processor 101. Therefore, the controller 102-3 of the second signal processor 102 controls to the display unit 104 input/output paths of video signals output from the video interface 100 via the first signal processor and of video signals directly output to the second signal processor (as the case may be). In particular, the control portion 102-3 of the second signal processor can be controlled by a user input via the user signal input unit 103 to select any of the video signals output from the video interface 100. If, for example, the selecting portion 101-1 of the first signal processor 101 selects the video signal output from the S-VIDEO terminal 100-3 of the video interface 100, typically, the selected video signal is directly output to the second signal processor 102. However, if, for example, the selecting portion 101-1 of the first signal processor 101 selects the video signal output from the TV tuner terminal 100-4 or the COMPOSITE terminal 100-5 of the video interface 100, typically, the selected video signal is output to the video decoder 101-2, which decodes the video signal output from one of the TV tuner terminal 100-4 and the COMPOSITE terminal 100-5 selected by the selecting portion 101-1, and outputs the decoded video signals to the second signal processor 102.

The second signal processor 102 processes a plurality of input video signals to make them displayable and outputs the plurality of processed input video signals to the display unit 104. The scaler 102-1 of the second signal processor 102 converts a resolution of input video signals into a suitable resolution for a specification of the display unit 104. In addition, the scaler 102-1 adjusts fine control functions of many determinants in addition to the resolution and outputs the processed video signals to the display unit 104. The deinterlacer 102-2 of the second signal processor 102 deinterlaces video signals decoded and output by the first signal processor 101 and outputs the deinterlaced video signals to the scaler 102-1 of the second signal processor 102.

The control portion 102-3 of the second signal processor 102 periodically receives a state signal from the video interface 100, which can be, for example, received periodically from the video interface 100 as programmed or received periodically as a response to periodic control signal requests from the second signal processor 102 (as the case may be). The state signal input to the second signal processor indicates which external device is presently inputting a video signal or which external device is inputting a new video signal. Here, the video signal presently input by an external device is called a first video signal, and the new video signal input by an external device is called a second video signal. When, for example, the first video signal is output from one of the D-SUB terminal 100-1 and the DVI terminal 100-2 of the video interface 100, the second video signal would typically be output from one of the S-VIDEO terminal 100-3, the TV tuner terminal 100-4, and the COMPOSITE terminal 100-5 of the video interface 100. Here, the first video signal would typically be directly input to the scaler 102-1 of the second signal processor 102, and the second video signal would typically be input to the scaler 102-1 after being processed by the first signal processor 101 and the deinterlacer 102-2 of the second signal processor 102.

When the first video signal is output from one of the S-VIDEO terminal 100-3, the TV tuner terminal 100-4, and the COMPOSITE terminal 100-5 of the video interface 100, the second video signal would typically be output from one of the D-SUB terminal 100-1 and the DVI terminal 100-2 of the video interface 100. Here, the first video signal would typically be input to the scaler 102-1 after being processed by the first signal processor 101 and the deinterlacer 102-2 of the second signal processor 102, and the second video signal would typically be directly input to the scaler 102-1 of the second signal processor 102.

As such, the control portion 102-3 of the second signal processor 102 senses the input of the second video signal while displaying the first video signal, in response to a state signal (newly input video state signal) input from the video interface 100. When a state signal indicating the input of the second video signal is received from the video interface 100, the control portion 102-3 outputs an OSD menu of display options for the newly input second video signal, including displaying a new video signal input message, to the display unit 104.

FIG. 2A illustrates the OSD menu displayed when the second video signal is input when (while) the first video signal is displayed. In FIG. 2A, as an example, the OSD menu includes the new video signal input message (NEW VIDEO INPUT) and submenus, such as a FULL SCREEN menu, a PIP screen menu, and a BACK menu, as selectable graphical displays of options for displaying the second video signal.

Accordingly, the control portion 102-3 of the second signal processor 102 receives an OSD menu selection signal input by the user signal input unit 103. If, for example, in FIG. 2B, the FULL SCREEN menu is selected by the user signal input unit 103 and the control portion 102-3 receives a FULL SCREEN menu selection signal, at operation 304, the displaying of the first video signal is discontinued while the second video signal is displayed on the full screen of the display unit 104. In other words, input/output paths of video signals are converted from input/output paths of the first video signal into input/output paths of the second video signal. FIG. 2B illustrates a display screen where the presently displayed video signal is converted into the new video signal when the FULL SCREEN display option for the new input video signal is selected from the OSD menu. In FIG. 2B, as an example, the first video signal is a TV signal and the second video signal is a PC signal.

If, for example, in FIG. 2C the PIP screen menu is selected by the user signal input unit 103 and the control portion 102-3 of the second signal processor 102 receives a PIP screen menu selection signal, the first video signal and the second video signal are simultaneously displayed on the display unit 104. Here, the first video signal is displayed on a main screen and the second video signal is displayed on a sub screen, or the first video signal is displayed on a sub screen and the second video signal is displayed on a main screen. In other words, input/output paths of video signals are converted from input/output paths of the first video signal into input/output paths of the second video signal. FIG. 2C illustrates a display screen where the presently displayed video signal and the new video signal are simultaneously displayed when the PIP display option is selected from the OSD menu. In FIG. 2C, as an example, the first video signal is a TV signal and the second video signal is a PC signal.

If, for example, in FIG. 2D, the BACK menu is selected by the user signal input unit 103 and the control portion 102-3 of the second signal processor 102 receives a BACK menu selection signal, the first video signal is continuously displayed on the display unit 104. That is, input/output paths of video signals are not converted, and input/output paths of the first video signal are maintained. At this time, in response to the BACK display option selection, the OSD menu is terminated. FIG. 2D illustrates a display screen where the presently displayed video signal is continuously displayed when the BACK display option is selected from the OSD menu.

Hereinafter, a method of processing a plurality of input video signals in a display device will be described with reference to FIGS. 2A through 2D and 3. At operation 300, the control portion 102-3 of the second signal processor 102 periodically checks the video interface 100 either via a received state signal or via a requested state signal (as the case may be). The video interface 100 receives various kinds of video signals input from an external source. In this case, the video interface 100 receives video signals transmitted from the PC (not shown) through the D-SUB terminal 100-1 and the DVI terminal 100-2, from the game console/other video output devices (not shown) through the S-VIDEO terminal 100-3, and from the TV (not shown) through the TV tuner terminal 100-4 and the COMPOSITE terminal 100-5. By checking the video interface 100, at operation 301, the control portion 102-3 of the second signal processor 102 determines whether a new video signal, aside from a presently displayed video signal, is input through the video interface 100.

When the presently displayed video signal is output from one of the D-SUB terminal 100-1 and the DVI terminal 100-2 of the video interface 100, the new video signal would typically be output from one of the S-VIDEO terminal 100-3, the TV tuner terminal 100-4, and the COMPOSITE terminal 100-5 of the video interface 100. Here, the presently displayed video signal would typically be directly input to the scaler 102-1 of the second signal processor 102, and the new video signal would typically be input to the scaler 102-1 after being processed by the first signal processor 101 and the deinterlacer 102-2 of the second signal processor 102.

When the presently displayed video signal is output from one of the S-VIDEO terminal 100-3, the TV tuner terminal 100-4, and the COMPOSITE terminal 100-5 of the video interface 100, the new video signal would typically be output from one of the D-SUB terminal 100-1 and the DVI terminal 100-2 of the video interface 100. Here, the presently displayed video signal would typically be input to the scaler 102-1 after being processed by the first signal processor 101 and the deinterlacer 102-2, while the new video signal would typically be directly input to the scaler 102-1 of the second signal processor 102.

In operation 302, after the control portion 102-3 of the second signal processor 102 checks the video interface 100, if a new video signal is input through the video interface 100 besides a presently displayed video signal, the control portion 102-3 automatically displays the OSD menu of display options for the newly input video signal, including displaying a new video signal input message.

FIG. 2A illustrates the OSD menu displayed when the second video signal is input during display of the first video signal. In FIG. 2A, the OSD menu includes the new video signal input message (NEW VIDEO INPUT) and submenus of display options for the newly input video signal, such as a FULL SCREEN menu, the PIP screen menu, and the BACK (or CONTINUE) menu. At operation 303, the control portion 102-3 of the second signal processor 102 determines whether the FULL SCREEN display option is selected from the OSD menu by the user signal input unit 103.

If, at operation 304, the FULL SCREEN menu is selected from the OSD menu, the control portion 102-3 of the second signal processor 102 displays the new video signal input through the video interface 100 on the full screen of the display unit 104. Accordingly, at operation 303, the control portion 102-3 of the second signal processor 102 receives an OSD menu selection signal input by the user signal input unit 103. If, at operation 303, the FULL SCREEN menu is selected by the user signal input unit 103 and the control portion 102-3 of the second signal processor 102 receives the FULL SCREEN menu selection signal, at operation 304, the displaying of the first video signal is discontinued while the second video signal is displayed on the full screen of the display unit 104. In other words, input/output paths of video signals are converted from input/output paths of the first video signal into input/output paths of the second video signal. FIG. 2B illustrates a display screen where the presently displayed video signal is converted into the new video signal when the FULL SCREEN display option is selected from the OSD menu. In FIG. 2B, as an example, the first video signal is a TV signal and the second video signal is a PC signal.

At operation 305, the control portion 102-3 of the second signal processor 102 determines whether the PIP screen display option for the new input video signal is selected from the OSD menu by the user signal input unit 103. If, at operation 305, the PIP screen menu is selected from the OSD menu, at operation 306, the control portion 102-3 of the second signal processor 102 displays the new video signal input through the video interface 100 on the sub screen of the PIP screen. In particular, if, at operation 305, the PIP screen menu is selected by the user signal input unit 103 and the control portion 102-3 of the second signal processor 102 receives the PIP screen selection signal from the use signal input unit 103, at operation 306, the first video signal and the second video signal are simultaneously displayed on the display unit 104 according to the PIP format. Here, for example, according to the PIP format, the first video signal is displayed on the main screen and the second video signal is displayed on the sub screen, or the first video signal is displayed on the sub screen and the second video signal is displayed on the main screen. In other words, input/output paths of video signals are converted from input/output paths of the first video signal into input/output paths of the second video signal. FIG. 2C illustrates a display screen where the presently displayed video signal and the new video signal are simultaneously displayed when the PIP display option is selected from the OSD menu. In FIG. 2C, as an example, the first video signal is a TV signal and the second video signal is a PC signal.

At operation 307, the control portion 102-3 of the second signal processor determines whether the BACK display option is selected from the OSD menu by the user signal input unit 103. If, at operation 307, the BACK menu is selected from the OSD menu, at operation 308, the control portion 102-3 of the second signal processor 102 terminates the OSD menu and continues displaying the presently displayed video signal. In particular, if, at operation 307, the BACK menu is selected by the user signal input unit 103 and the control portion 102-3 of the second signal processor 102 receives the BACK menu selection signal from the user signal input unit 103, at operation 308, the first video signal is continuously displayed on the display unit 104. That is, at operation 308, the input/output paths of video signals are not converted and input/output paths of the first video signal are maintained and the OSD menu is terminated. FIG. 2D illustrates a display screen where the presently displayed video signal is continuously displayed when the BACK display option is selected from the OSD menu.

As described above, the present invention automatically (i.e., sensibly, detectably) provides a user with the OSD menu by which the user can select whether to display a new video signal on a full screen or a PIP screen or to maintain the present (current) display, without any complicated manual key manipulation to show (display) an OSD menu of newly input video signal display options. Also, the present invention performs signal processing according to a user's selection and automatically converts input/output paths of desired video signals, thus improving user convenience. In particular, in FIG. 3, at operations 304, 306, and 308, the control portion 102-3 of the second signal processor 102 communicates via a selection control signal with the selecting portion 101-1 of the first signal processor 101 to select or deselect any of the video signals output from the video interface 100 to the second signal processor 102 via the first signal processor 101, or the control portion 102-3 of the second signal processor 102 selects one of the video signals directly output from the video interface 100 to the second signal processor 102 (as the case may be according to a display unit specification/requirements, but not limited to any specific display unit specification), thereby controlling input/output paths of video signals output from the video interface 100 to the display unit 104.

Therefore, the present invention provides a video signal computer processor comprising a programmed computer processor processing a plurality of varied video signals input from varied external devices to output to a display device by sensing (detecting) a new video signal, aside from a presently displayed video signal, input through a video interface, and automatically displaying a menu of display options (i.e., automatically displaying selectable graphical displays of display options) for the newly input video signal to convert input/output paths of the presently input video signal to the newly input video signal. Input of a new video signal, aside from a presently displayed video signal, is periodically checked according to a received or requested (as the case may be) state signal from a video interface that receives various video signals output from external computing devices, and if the new video signal is input, a new video signal input message, and a predetermined menu for selecting whether to display the new video signal, are automatically (i.e., sensibly or detectably) displayed. According to an input menu selection signal, the new video signal is displayed or the displaying of the presently displayed video signal is continued. The processes of the present invention can be implemented in computing software and/or computer hardware as embodied in a computing device (or a computing system portion), as the case may be, that processes input video signals to output to a display unit (i.e., the present invention as embodied in an apparatus and method processes video signals and is in communication with or interfaces with a display unit).

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed is:

1. An apparatus processing a plurality of input video signals in a display device, the apparatus comprising:
   a first signal processor, which selects a video signal from the plurality of video signals and outputs the selected video signal or decodes and outputs the selected video signal; and
   a second signal processor, which senses a new video signal output from the video interface and displays a menu for selecting any one of whether to output the new video signal, whether to continue outputting the presently displayed video signal, and whether to output both the new video signal and the presently displayed video signal for simultaneous display on a single display screen, the menu providing for the selecting without requiring a user to access another menu.

2. The apparatus of claim 1, wherein the first signal processor comprises:
   a selecting portion, which selects the first video signal from a plurality of video signals output from the video interface according to a selection control signal of the second signal processor; and
   a decoding portion, which decodes the first video signal selected by the selecting portion.

3. The apparatus of claim 1, wherein the second signal processor comprises:
   a scaler, which scales an output signal of the video interface or an output signal of the first signal processor according to a specification of the display unit; and
   a controller, which, if the input of the new video signal is sensed where one of the selected video signal and the other video signal is presently displayed, displays the menu for selecting whether to display the new video signal, and controls at least one of the video signal that is presently displayed and the new video signal to be displayed according to the menu selection.

4. The apparatus of claim 3 further comprising a deinterlacer which deinterlaces the video signal output from the first signal processor according to the specification of the display unit.

5. The apparatus of claim 3, wherein the controller periodically checks the video interface to sense the input of the new video signal.

6. The apparatus of claim 3, wherein the predetermined menu displayed by the controller comprises a full screen menu selection, a picture-in-picture (PIP) screen menu selection, and a back menu selection for selecting whether to display the new video signal.

7. The apparatus of claim 6, wherein, if the full screen menu is selected, the video signal being presently displayed is not processed anymore by the second signal processor, and the new video signal is displayed on a full screen by the second signal processor.

8. The apparatus of claim 6, wherein, if the PIP screen menu is selected, the video signal presently displayed and the new video signal are simultaneously displayed on a PIP screen by the second signal processor.

9. The apparatus of claim 6, wherein, if the back menu is selected, the video signal presently displayed is continuously processed by the second signal processor.

10. A method of processing a plurality of video signals in a display device, the method comprising:
   periodically checking if a new video signal, aside from a presently displayed video signal, is input;
   automatically displaying a predetermined menu if the new video signal is input according to the checking, the menu allowing a user to select any one of whether to display the new video signal, whether to continue displaying the presently displayed video signal, and whether to simultaneously display both the new video signal and the presently displayed video signal on a single display screen, wherein the menu enables the user to make the selection without requiring the user to access another menu.

11. The method of claim 10, wherein the automatically displayed predetermined menu comprises a full screen menu selection, a picture-in-picture (PIP) screen menu selection, and a back menu selection.

12. The method of claim 11, wherein, if the full screen menu is selected, the presently displayed video signal is not displayed, and the new video signal is displayed on a full screen.

13. The method of claim 11, wherein, if the PIP screen menu is selected, the presently displayed video signal and the new video signal are simultaneously displayed on a screen.

14. The method of claim 11, wherein, if the back menu is selected, the presently displayed video signal is continuously displayed.

15. A video signal computer processor, comprising:
   a programmed computer processor controlling the video signal processor according to a process comprising:
      processing the plurality of input varied video signals to output to a display screen,
      detecting a new video signal, aside from a presently displayed video signal periodically checking if a new video signal, aside from a presently displayed video signal, is input;
      automatically displaying a predetermined menu if the new video signal is input according to the detecting, the menu allowing a user to select any one of whether to display the new video signal to the display screen, whether to continue displaying the presently displayed video signal, and whether to simultaneously display both the new video signal and the presently displayed video signal on the display screen, wherein the menu enables the user to make the selection without requiring the user to access another menu.

16. The video signal computer processor of claim 15, wherein the new video signal detecting comprises:
periodically checking a received or requested state signal from the video interface that receives varied video signals, to determine the input of the new video signal.

17. The video signal computer processor of claim 15, wherein the automatically displaying of the selectable graphical displays comprises displaying selectable graphical displays of display options for a full screen, a picture-in-picture (PIP), and a maintain the present display screen.

18. The video signal computer processor of claim 15, further comprising managing input/output paths of the presently input video signal and the newly input video signal to perform one of:
displaying the new video signal, or
continuing to display the presently displayed video signal, or
simultaneously displaying both the new video signal and the presently displayed video signal on a single display screen,
according to the selection of the user.

19. The video signal computer processor of claim 18, wherein the simultaneous displaying of both the new video signal and the presently displayed video signal on the single display screen is performed using a picture in a picture subscreen.

20. The apparatus of claim 1, wherein the second signal processor further comprises any one of:
outputting the new video signal, or
continuing to output the presently displayed video signal, or
outputting both the new video signal and the presently displayed video signal for simultaneous display on the single display screen,
according to the selecting.

21. The apparatus of claim 20, wherein the simultaneous displaying of both the new video signal and the presently displayed video signal on a single display screen is performed using a picture in a picture subscreen.

22. The method of claim 10, further comprising one of:
displaying the new video signal, or
continuing to display the presently displayed video signal, or
simultaneously displaying both the new video signal and the presently displayed video signal on a single display screen,
according to the selecting.

23. The method of claim 22, wherein the simultaneous displaying of both the new video signal and the presently displayed video signal on a single display screen is performed using a picture in a picture subscreen.

* * * * *

UNITED STATES PATENT AND TRADEMARK OFFICE
CERTIFICATE OF CORRECTION

| | | |
|---|---|---|
| PATENT NO. | : 7,453,520 B2 | Page 1 of 1 |
| APPLICATION NO. | : 10/837667 | |
| DATED | : November 18, 2008 | |
| INVENTOR(S) | : Jung-dae Kim | |

It is certified that error appears in the above-identified patent and that said Letters Patent is hereby corrected as shown below:

Column 11, Line 17, change "a" to --to--.

Signed and Sealed this

Tenth Day of February, 2009

JOHN DOLL
*Acting Director of the United States Patent and Trademark Office*